(12) United States Patent
Li

(10) Patent No.: US 12,715,064 B2
(45) Date of Patent: Aug. 25, 2026

(54) APPARATUS AND METHOD FOR CUTTING OPENING FROM WORKPIECE

(71) Applicant: ABB Schweiz AG, Baden (CH)

(72) Inventor: Jinsong Li, Shanghai (CN)

(73) Assignee: ABB Schweiz AG, Baden (CH)

( * ) Notice: Subject to any disclaimer, the term of this patent is extended or adjusted under 35 U.S.C. 154(b) by 1043 days.

(21) Appl. No.: 17/759,034

(22) PCT Filed: Feb. 6, 2020

(86) PCT No.: PCT/CN2020/074432
§ 371 (c)(1),
(2) Date: Jul. 18, 2022

(87) PCT Pub. No.: WO2021/155536
PCT Pub. Date: Aug. 12, 2021

(65) Prior Publication Data
US 2023/0035853 A1 Feb. 2, 2023

(51) Int. Cl.
*B23K 26/03* (2006.01)
*B23K 26/06* (2014.01)
(Continued)

(52) U.S. Cl.
CPC ........ *B23K 26/032* (2013.01); *B23K 26/0613* (2013.01); *B23K 26/0876* (2013.01); *B23K 26/38* (2013.01)

(58) Field of Classification Search
CPC ........................... B23K 26/032; B23K 26/042; B23K 26/0613; B23K 26/0876; B23K 26/38;
(Continued)

(56) References Cited

U.S. PATENT DOCUMENTS 9,452,492 B2 * 9/2016 Watkins ................. B23K 26/03
2001/0006168 A1 7/2001 Okumura et al.
(Continued)

FOREIGN PATENT DOCUMENTS

CA 2235173 A1 10/1998
CN 101318264 A 12/2008
(Continued)

OTHER PUBLICATIONS

International Search Report and Written Opinion, issued by the ISA/CN National Intellectual Property Administration; regarding corresponding patent application Serial No. PCT/CN2020/074432; dated Nov. 11, 2020; 10 pages.

*Primary Examiner* — Edward F Landrum
*Assistant Examiner* — Adam M Eckardt
(74) *Attorney, Agent, or Firm* — Whitmyer IP Group LLC

(57) ABSTRACT

Devices and methods for cutting an opening from a workpiece. The apparatus comprises a first emitter and a second emitter, a power of a first laser emitted by the first emitter being smaller than a power of a second laser emitted by the second emitter. The apparatus further comprises a laser head, an image sensor, and a processing unit. The laser head is coupled to the first and second emitters and adapted to move adjacent to a first side of a workpiece and direct the first and second lasers onto the first side. The image sensor is configured to receive the first laser to form an image of the first laser. The processing unit is configured to determine a difference between a profile of the image of the first laser and a predetermined profile of an opening to be cut from the workpiece.

10 Claims, 2 Drawing Sheets

(51) Int. Cl.
*B23K 26/08* (2014.01)
*B23K 26/38* (2014.01)

(58) Field of Classification Search
CPC .... B23K 26/03; B23K 26/0608; B23K 26/06; B23K 26/08; B23K 26/04
See application file for complete search history.

(56) References Cited

U.S. PATENT DOCUMENTS

| | | | | |
|---|---|---|---|---|
| 2005/0247894 | A1 | 11/2005 | Watkins | |
| 2023/0001506 | A1* | 1/2023 | Oguchi | B23K 26/21 |

FOREIGN PATENT DOCUMENTS

| | | | |
|---|---|---|---|
| CN | 102581495 | A | 7/2012 |
| CN | 103785956 | A | 5/2014 |
| CN | 106041325 | A | 10/2016 |
| CN | 107020449 | A | 8/2017 |
| CN | 108673005 | A | 10/2018 |
| CN | 109803770 | B | 2/2020 |
| DE | 102010020183 | B4 | 7/2013 |
| EP | 1238746 | A2 | 9/2002 |
| JP | 2011235347 | A | 11/2011 |
| WO | 2019151911 | A1 | 8/2019 |

* cited by examiner

APPARATUS AND METHOD FOR CUTTING OPENING FROM WORKPIECE

CROSS-REFERENCE TO RELATED APPLICATIONS

This is a national stage application which claims priority to International patent application Serial No.: PCT/CN2020/074432, filed on Feb. 6, 2020; and which is herein incorporated by reference in its entirety.

FIELD

Example embodiments of the present disclosure generally relate to improvement of the laser cutting, and more particularly, to an apparatus for cutting an opening from a workpiece and a method for the same.

BACKGROUND

In the field of laser cutting, a laser head is attached to an articulated robot to carry out the laser cutting. One critical mission is to achieve high shape accuracy of the cutting features, for example the roundness of an opening. When the moving speed for the articulated robot is high, the shape of the cut opening may always unsatisfactory for the users. How to cut an opening from a workpiece with the intended profile in an easy way becomes a challenge for the designers.

Conventionally, there is provided a plurality of methods to use a robot to cut the opening with a desired shape. For example, a structural stiffness of the articulated robot may be improved to ensure the accuracy of the laser cutting. As another example, a micro-motion platform may be considered. However, these approaches is complicated and expensive. For example, in CN108673005, it is proposed a solution for automatic tracking the weld by correction. However, the method is not applicable for cutting an opening and thus the accuracy of cutting the opening cannot be achieved.

Therefore, there is a need for a simpler and cheaper design to enable the removal of the opening from a workpiece.

SUMMARY

Example embodiments of the present disclosure propose a solution for improving the accuracy of the shape tuning.

In a first aspect, an apparatus is provided. The apparatus comprises a first emitter and a second emitter, a power of a first laser emitted by the first emitter being smaller than a power of a second laser emitted by the second emitter; a laser head coupled to the first and second emitters and adapted to move adjacent to a first side of a workpiece and direct the first and second lasers onto the first side; an image sensor arranged adjacent to a second side of the workpiece opposite to the first side and configured to receive the first laser to form an image of the first laser; and a processing unit coupled to the image sensor and configured to determine a difference between a profile of the image of the first laser and a predetermined profile of an opening to be cut from the workpiece and to cause the second emitter to emit the second laser to cut the opening if the difference is below a predefined threshold.

According to embodiments of the present disclosure, the opening can be cut from the workpiece in a fast and accurate manner. Therefore, the efficiency of laser cutting in high speed can be improved.

In some embodiments, the apparatus further comprises a laser reducer arranged between the second side of the workpiece and the image sensor and configured to reduce the power of the first laser emitted onto the image sensor.

In some embodiments, the image sensor is a sensor without a lens.

In some embodiments, the image sensor comprises a plurality of imaging unit arranged in an array.

In some embodiments, a path of the first laser coincides with that of the second laser.

In some embodiments, the opening is of a cylindrical shape and a central axis of the opening is parallel to path of the first and second lasers.

In some embodiments, a size of the opening along a direction perpendicular to the first laser substantially equals to a size of the image sensor along the direction.

In some embodiments, the image sensor is configured to receive the first laser with different exposure time.

In some embodiments, the laser reducer is a laser filter or a laser reflector.

In some embodiments, the laser reducer and the image sensor are contained within a housing and the housing is coupled to the workpiece with a coupler.

In a second aspect, a method is provided. The method comprises providing a first emitter and a second emitter, a power of a first laser emitted by the first emitter being smaller than a power of a second laser emitted by the second emitter; providing a laser head coupled to the first and second emitters and adapted to move adjacent to a first side of a workpiece and direct the first and second lasers onto the first side; arranging an image sensor adjacent to a second side of the workpiece opposite to the first side and configured to receive the first laser to form an image of the first laser; and providing a processing unit, the processing unit coupled to the image sensor and configured to determine a difference between a profile of the image of the first laser and a predetermined profile of an opening to be cut from the workpiece and to cause the second emitter to emit the second laser to cut the opening if the difference is below a predefined threshold.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
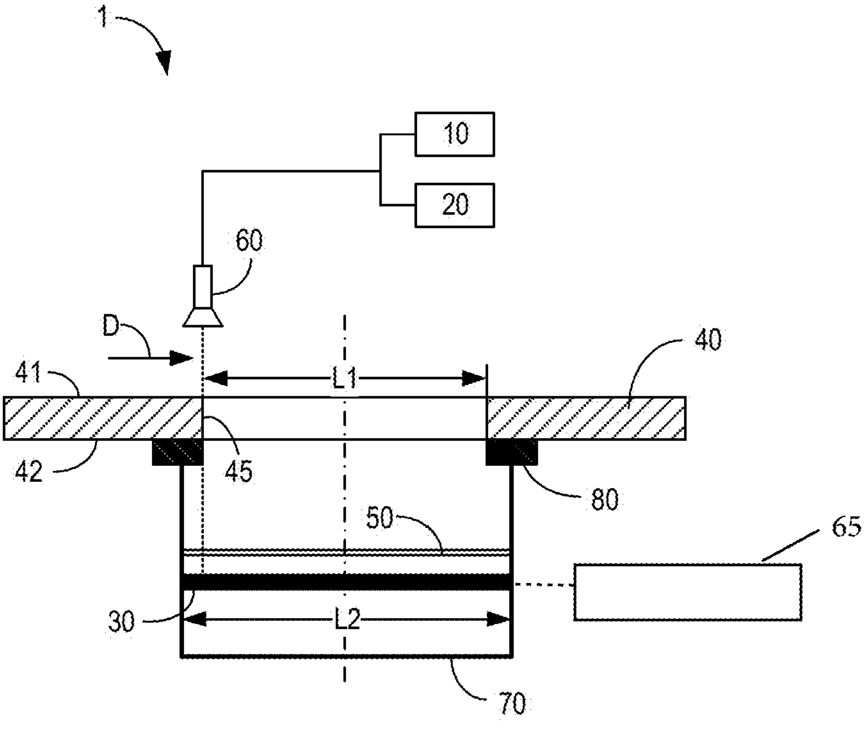
FIG. 1 illustrates a cross-sectional view of an apparatus for cutting an opening from a workpiece in accordance with an example embodiment of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

Embodiments of the present invention will be described in detail with reference to FIGS. 1-2 hereinafter.

FIG. 1 illustrates a cross-sectional view of an apparatus 1 for cutting an opening 45 from a workpiece 40 in accordance with an example embodiment of the present disclosure. FIG. 2 illustrates a top view of an exemplary workpiece 40 with an opening 45 cut therefrom.

As shown, the apparatus 1 generally comprises a first emitter 10 and a second emitter 20, a laser head 60 and an image sensor 30. The two emitters 10, 20 emit different lasers with different power. In other words, the first emitter 10 and the second emitter 20 emit a first laser and a second laser, respectively, wherein a power of a first laser is smaller than a power of the second laser.

As illustrated, the workpiece 40 has a first side 41 and a second side 42 opposite to each other. The laser head 60 is coupled to the two emitters 10, 20 and able to move adjacent to the first side 41 of the workpiece 40. The laser head 60 directs the first and second lasers onto the first side 41 of the workpiece 40. As illustrated in FIG. 1, the image sensor 30 configured to receive the first laser is arranged adjacent to the second side 42. Thus, an image of the first laser can be formed.

The apparatus 1 further comprises a processing unit 65 coupled to the image sensor 30. The processing unit 65 is configured to compare a profile of the image of the first laser with an intended profile of the opening 45 to be cut and then determine the difference between the two profiles. In case that the difference is below a predefined threshold, the processing unit 65 is configured to cause the second emitter 20 to emit the second laser to cut the opening 45.

Therefore, with the laser head 60 and the image sensor 30 arranged at the different sides of the workpiece 40, the lasers emitted by the laser head 60 can directly hit the image sensor 30 without any reflection. In this way, the opening 45 can be cut from the workpiece 40 fast and accurately. Moreover, as the image sensor 30 is commercially available, the cost of the whole apparatus 1 is kept low.

In some embodiments, the apparatus may further comprise a laser reducer 50 arranged between the second side 42 of the workpiece 40 and the image sensor 30. The laser reducer 50 may be configured to reduce the power of the first laser emitted onto the image sensor 30. For example, the laser emitted by the laser head 60 may be of an order of milliwatts and the power of the laser acceptable for the image sensor 30 is merely a few microwatts. Therefore, with the laser reducer 50, the power of the laser can be reduced to a level appropriate for the image sensor.

In some embodiments, the laser reducer 50 may reduce the power of the laser by thousands of times. It is to be understood that the values listed above are only illustrative, rather than restrictive. In some embodiments, the laser reducer 50 may alternatively reduce the power of the laser by ten thousand of times or even more, which depends on the actual need of the users. The laser reducer 50 may be selected according to the power of the laser emitted by the laser head 60 and the power of the laser that can be withstood by the image sensor 30. In this way, the power of the laser emitted by the laser head 60 can be extended and thus the usage of the apparatus 1 can be expanded.

In some embodiments, the image sensor 30 may be a senor without a lens. In this way, the determination of the intended path for the first laser can be carried out without any distortion. Moreover, the complexity of the optical transmission can be avoided, thus making it much easier to obtain the intended path for the first laser.

In some embodiments, the image sensor 30 may comprise a plurality of imaging units arranged in an array.

In some embodiments, a path of the first laser may coincide with that of the second laser. In this way, once the intended path for the laser is determined, the opening 45 can be cut from the workpiece 40 with a laser with greater power. In this way, the accuracy of the laser cutting the opening can be guaranteed.

In some embodiments, the processing unit 65 may be configured to perform a shape tuning based on an iterative leaning control. With the iterative leaning control, when the profile of the image of the first laser has been obtained, the processing unit 65 can compare the profile to the predetermined profile of an opening. If the difference between the two profiles is above the predefined threshold, the first laser would be adjusted to form a new profile. The processing unit 65 then repeats the comparison and the profile of the image gradually approaches the predefined threshold. If the difference is below the predefined threshold, the path of the laser to cut the opening 45 has been determined. Subsequently, the first laser is deactivated and the image sensor 40 and the laser reducer 50 are removed. The workpiece 40 is then replaced by a new one. The second laser, which has a greater power, is activated to cut the opening 45 from the new workpiece to substantially follow the predetermined path of the profile.

In some embodiments, the power of the first laser may be of an order of milliwatts. In some embodiments, the power of the second laser may be of an order of a hundred Watts or ever more. In other embodiments, the power of the second laser may be of an order of kilowatts.

Figure 2:
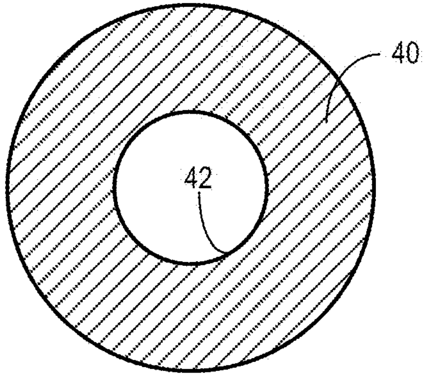
FIG. 2 illustrates a top view of an exemplary workpiece with an opening cut therefrom.

In some embodiments, as illustrated in FIG. 2, the opening 45 may be of a cylindrical shape and a central axis of the opening 45 may be parallel to path of the first and second lasers. In this way, a small circle with an intended roundness can be cut from the workpiece 40. The cutting of the circle opening 45 can be performed in a very convenient manner.

Although FIG. 2 illustrates that the opening 45 is of a circular shape, it is to be understood that, this is merely example without suggesting any limitation as to the scope of the present disclosure. In an alternative embodiment, the opening 45 may be of an oval shape.

In some embodiments, a size L1 of the opening 45 along a direction D perpendicular to the first laser may substantially equal to a size L2 of the image sensor 30 along the direction D. In this way, as the opening 45 and the image sensor 30 are substantially of the same size, the lens can be omitted.

In some embodiments, the image sensor 30 may further be configured to receive the first laser to form different types of images thereof with different exposure time.

In some embodiments, the exposure time is relatively long such that a complete profile of the image of the first laser can be obtained. In some embodiments, the exposure time may be more than 1 second. In this way, since the image can be captured using only one shot with complicated post-processing, the expense of the apparatus 1 is kept low.

In some embodiments, the exposure time is relatively short, such that merely a segment of, rather than the whole profile of the image can be obtained. In such a case, the whole profile of the image may be derived by joining different images captured by the image sensor 30. In some embodiments, the exposure time may be more than 1/250 second. In this way, owing to the short exposure time, the segment of the profile of the image is clear. Therefore, the accuracy of the laser cutting can be further improved.

It is to be understood that the values for the exposure time listed above are only illustrative, rather than restrictive. In some embodiments, the exposure time may be different from the listed values, which may depend on the actual need of the users.

In some embodiments, the laser reducer 50 may be a laser filter. It is to be understood that the specific form of the laser reducer 50 are not limited herein. The laser reducer 50 may take any other forms already known or to be developed in the future, e.g. a laser reflector, as long as the power of the laser passing through the laser reducer 50 can be reduced to a level that might be accepted by the image sensor 30. In other embodiments, by using the laser reducer 50, the laser may be band-pass filtered for a specific wavelength.

In some embodiments, the laser reducer 50 and the image sensor 30 may be contained within a housing 70. In this way, the laser reducer 50 and the image sensor 30 may be customized to an integrated component according to the actual need of the users.

In some embodiments, the housing 70 may be coupled to the workpiece 40 with a coupler 80. The relative movement between the image sensor 30 and the workpiece 40 could be eliminated with the coupler 80. In this way, the measuring accuracy can be ensured in high speed.

In some embodiments, the coupler 80 may be a magnet. In alternative embodiment, the coupler 80 may be a vacuum chuck.

In some embodiments, the processing unit 65 may be integrated with the image sensor 30. In alternative embodiment, the processing unit 65 may be a separate component. It is to be understood that the specific manner of connection is not limited herein, rather, it may be determined according to the specific working environment of the apparatus 1.

Figure 3:
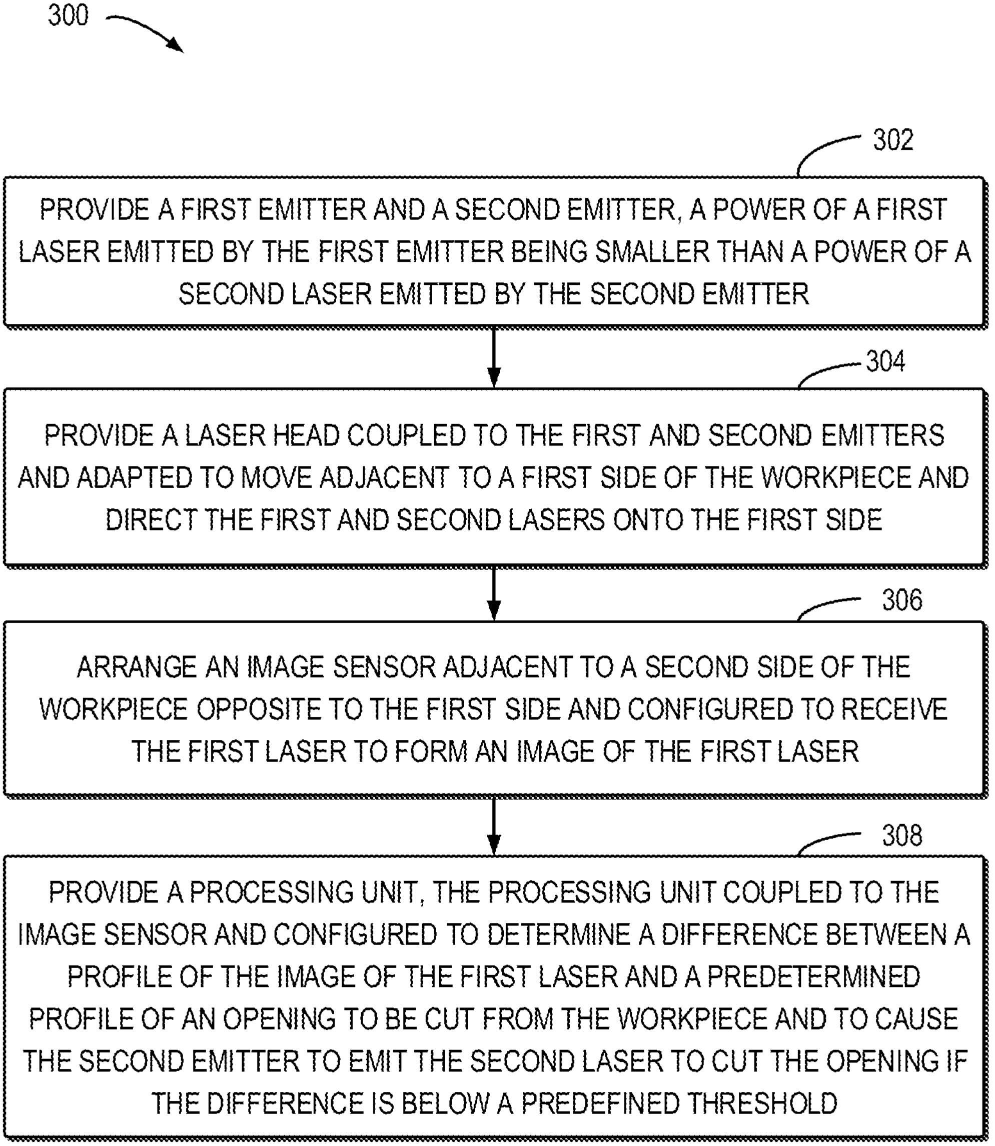
FIG. 3 illustrates a method of cutting opening from workpiece in accordance with some example embodiments of the present disclosure.

FIG. 3 illustrates a method 300 of cutting an opening 45 from a workpiece 40 in accordance with some example embodiments of the present disclosure.

At block 302, a first emitter 10 and a second emitter 20 are provided. A power of a first laser emitted by the first emitter 10 is smaller than a power of a second laser emitted by the second emitter 20.

At block 304, a laser head 60 is provided. The laser head 60 is coupled to the first and second emitters 10, 20 and adapted to move adjacent to a first side 41 of a workpiece 40 and direct the first and second lasers onto the first side 41.

At block 306, an image sensor 30 is arranged adjacent to a second side 42 of the workpiece 40 opposite to the first side 41 and configured to receive the first laser to form an image of the first laser.

At block 308, a processing unit 65 is coupled to the image sensor 30. The processing unit 65 is configured to determine a difference between a profile of the image of the first laser and a predetermined profile of an opening 45 to be cut from the workpiece 40 and to cause the second emitter 20 to emit the second laser to cut the opening 45 if the difference is below a predefined threshold.

In some embodiment, referring back to FIGS. 1 and 2, the method 300 may further comprise providing a laser reducer 50. The laser reducer 50 is arranged between the second side 42 of the workpiece 40 and the image sensor 30 and is further configured to reduce the power of the first laser emitted onto the image sensor 30.

In some embodiments, at block 308, the image sensor 30 may be a senor without a lens.

In some embodiments, at block 308, the image sensor 30 may comprise a plurality of imaging units arranged in an array.

In some embodiments, at block 308, the opening 45 may be of a cylindrical shape and a central axis of the opening 45 may be parallel to path of the first and second lasers.

In some embodiments, the method 300 may further comprise providing a housing 70 to contain the laser reducer 50 and the image sensor 30. A coupler 80 may be provided to couple the housing 70 to the workpiece 40.

It is to be understood that the apparatus, the structure or the process involved in FIG. 3 have been described above with reference to FIGS. 1-2, and the details will not be described hereinafter for the sake of brevity.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Compared with the conventional approaches to cut an opening from a workpiece, by simply providing an image sensor 30 at the side of the workpiece 40 opposite to the laser head 60, the cutting can be conducted much easier and the accuracy can be improved. Besides, there is no need to change the micro-motion platform or the stiffness of the robotic system. Thus, the cost can be reduced.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:

a first emitter and a second emitter, a power of a first laser emitted by the first emitter being smaller than a power of a second laser emitted by the second emitter;

a laser head coupled to the first and second emitters and adapted to move adjacent to a first side of a workpiece and direct the first and second lasers onto the first side; and an image sensor arranged adjacent to a second side of the workpiece opposite to the first side and configured to receive the first laser to form an image of the first laser;

wherein, in response to a difference between a profile of the image of the first laser received by the image sensor and a predetermined profile of an opening to be cut from the workpiece, the second emitter emits the second laser to cut the opening in the workpiece if the difference is below a predefined threshold.

2. The apparatus of claim 1, further comprising:

a laser reducer arranged between the second side of the workpiece and the image sensor and configured to reduce the power of the first laser emitted onto the image sensor.

3. The apparatus of claim 1, the image sensor is a sensor without a lens.

4. The apparatus of claim 1, wherein a path of the first laser coincides with that of the second laser.

5. The apparatus of claim 4, wherein the opening is of a cylindrical shape and a central axis of the opening is parallel to path of the first and second lasers.

6. The apparatus of claim 1, wherein a size of the opening along a direction perpendicular to the first laser substantially equals to a size of the image sensor along the direction.

7. The apparatus of claim 1, wherein the image sensor is configured to receive the first laser with different exposure time.

8. The apparatus of claim 2, wherein the laser reducer is a laser filter or a laser reflector.

9. The apparatus of claim 2, wherein the laser reducer and the image sensor are contained within a housing and the housing is coupled to the workpiece with a coupler.

10. A method, comprising:

providing a first emitter and a second emitter, a power of a first laser emitted by the first emitter being smaller than a power of a second laser emitted by the second emitter;

providing a laser head coupled to the first and second emitters and adapted to move adjacent to a first side of a workpiece and direct the first and second lasers onto the first side;

arranging an image sensor adjacent to a second side of the workpiece opposite to the first side and configured to receive the first laser to form an image of the first laser; and in response to a difference between a profile of the image of the first laser received by the image sensor and a predetermined profile of an opening to be cut from the workpiece is below a predefined threshold, emitting the second laser by the second emitter to cut the opening in the workpiece.

* * * * *